(12) United States Patent
Ott et al.

(10) Patent No.: US 11,291,988 B2
(45) Date of Patent: Apr. 5, 2022

(54) PIPETTE TIP FOR AN AUTOMATED PIPETTING DEVICE

(71) Applicant: TECAN TRADING AG, Mannedorf (CH)

(72) Inventors: Philipp Ott, Steg im Tosstal (CH); Matthias Dzung, Wettingen (CH); Martin Kuster, Eschenbach (CH)

(73) Assignee: TECAN TRADING AG, Mannedorf (CH)

( * ) Notice: Subject to any disclaimer, the term of this patent is extended or adjusted under 35 U.S.C. 154(b) by 348 days.

(21) Appl. No.: 16/308,783

(22) PCT Filed: Jul. 21, 2017

(86) PCT No.: PCT/EP2017/068494
§ 371 (c)(1),
(2) Date: Dec. 10, 2018

(87) PCT Pub. No.: WO2018/015543
PCT Pub. Date: Jan. 25, 2018

(65) Prior Publication Data
US 2019/0143317 A1     May 16, 2019

(30) Foreign Application Priority Data

Jul. 22, 2016  (CH) .................................. 00950/16
Feb. 10, 2017  (CH) .................................. 00159/17
Apr. 19, 2017  (CH) .................................. 00523/17

(51) Int. Cl.
*B01L 3/02*       (2006.01)
*G01F 23/263*   (2022.01)
(Continued)

(52) U.S. Cl.
CPC ............ *B01L 3/0275* (2013.01); *B01L 3/021* (2013.01); *B01L 3/54* (2013.01); *B01L 9/54* (2013.01);
(Continued)

(58) Field of Classification Search
CPC .... B01L 3/021; B01L 3/54; B01L 9/54; B01L 9/543; B01L 2200/0605; B01L 2200/143;
(Continued)

(56) References Cited

U.S. PATENT DOCUMENTS 5,045,286 A * 9/1991 Kitajima ............... G01F 23/245
                                                                422/518
6,551,558 B1 * 4/2003 Mann ..................... G01F 23/24
                                                                116/109
(Continued)

FOREIGN PATENT DOCUMENTS

EP       2840366 A1      2/2015

OTHER PUBLICATIONS

International Search Report for corresponding PCT application No. PCT/EP2017/068494, dated Oct. 18, 2017.
(Continued)

*Primary Examiner* — Jennifer Wecker
*Assistant Examiner* — Oyeleye Alexander Alabi
(74) *Attorney, Agent, or Firm* — Notaro, Michalos & Zaccaria P.C.

(57) ABSTRACT

The invention concerns pipette tips for connecting to a pipette tube of a pipetting device are used for taking up and discharging fluids. The pipette tip is in the shape of an elongated tube forming a pipette body that has an opening at one end and is designed for connecting to the pipette tube at the other end. The pipette tip has a first electrode as a volume measuring electrode of a measuring capacitor and a second electrode as an immersion detector electrode. The first
(Continued)

electrode is located on an outer surface of the pipette body or is embedded in the pipette body, and the second electrode is located at least partially on an inner surface of the pipette body.

11 Claims, 11 Drawing Sheets

(51) Int. Cl.
G01N 35/10 (2006.01)
B01L 3/00 (2006.01)
G01D 5/241 (2006.01)
G01N 35/00 (2006.01)
B01L 9/00 (2006.01)
G01F 22/00 (2006.01)
B25J 9/16 (2006.01)

(52) U.S. Cl.
CPC ............ B01L 9/543 (2013.01); B25J 9/1664 (2013.01); G01D 5/2417 (2013.01); G01F 22/00 (2013.01); G01F 23/263 (2013.01); G01N 35/0099 (2013.01); G01N 35/00584 (2013.01); G01N 35/00732 (2013.01); G01N 35/1011 (2013.01); G01N 35/1016 (2013.01); B01L 2200/0605 (2013.01); B01L 2200/143 (2013.01); B01L 2300/021 (2013.01); B01L 2300/0645 (2013.01); B01L 2400/049 (2013.01); B01L 2400/0487 (2013.01); G01N 2035/00811 (2013.01); G01N 2035/103 (2013.01); G01N 2035/1013 (2013.01); G01N 2035/1025 (2013.01); G01N 2035/1034 (2013.01)

(58) Field of Classification Search
CPC ....... B01L 2300/021; B01L 2300/0645; B01L 2400/049; B25J 9/1664; G01D 5/2417; G01F 23/263; G01N 35/00584; G01N 35/00732; G01N 35/0099; G01N 35/1011; G01N 35/1016; G01N 2035/00811; G01N 2035/1013; G01N 2035/1025; G01N 2035/103; G01N 2035/1034
See application file for complete search history.

(56) References Cited

U.S. PATENT DOCUMENTS

2005/0279855 A1* 12/2005 Baker ................ G01N 35/1016
239/71
2013/0136672 A1* 5/2013 Blumentritt ........... G01F 23/268
422/524

OTHER PUBLICATIONS

International Preliminary Report on Patentability and Written Opinion for corresponding PCT application No. PCT/EP2017/068494, dated Jan. 22, 2019.

* cited by examiner

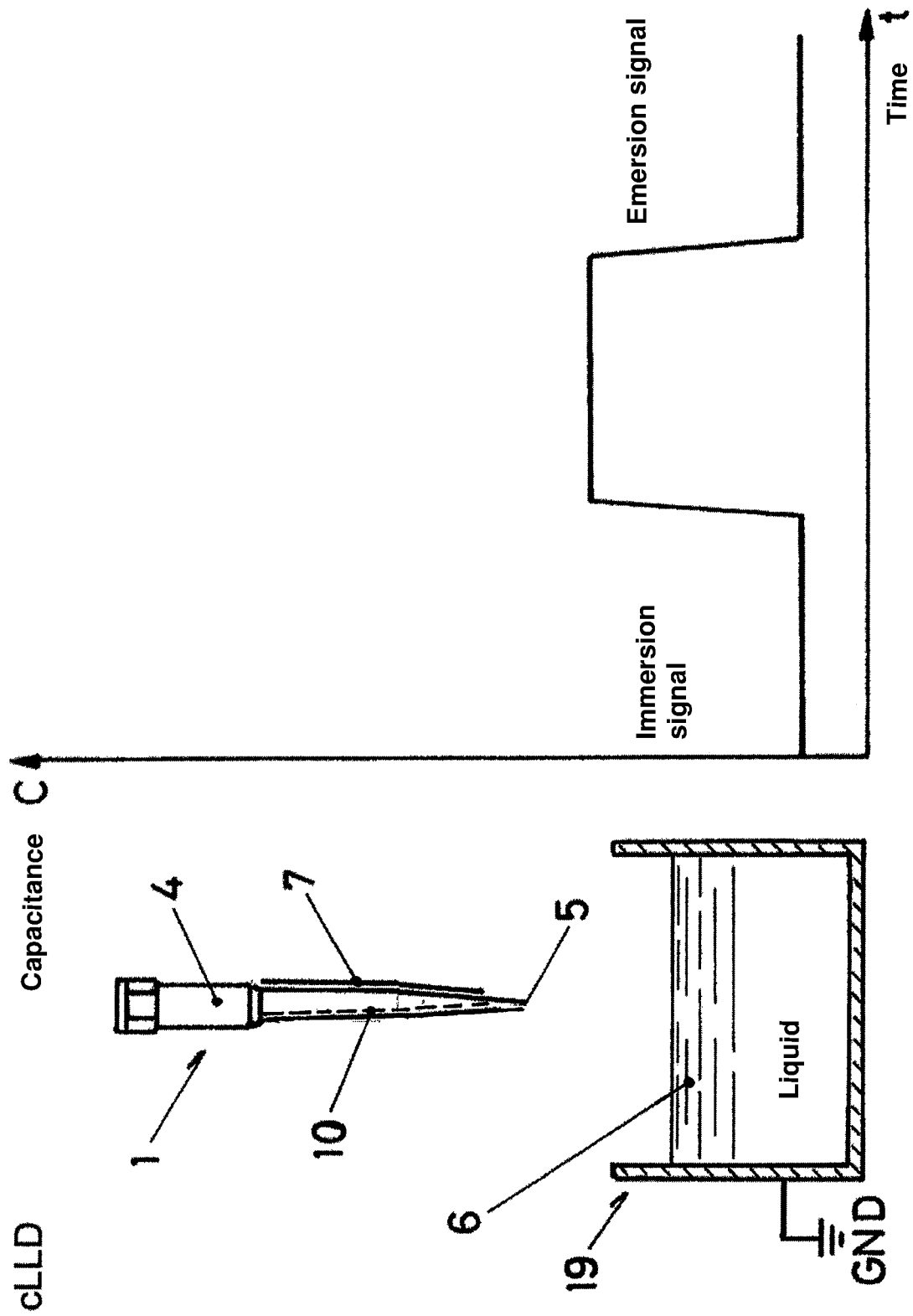

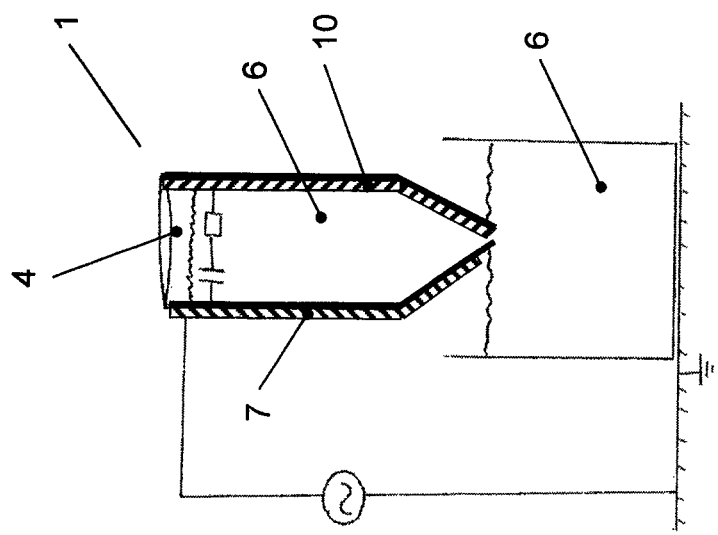
Fig. 6b)
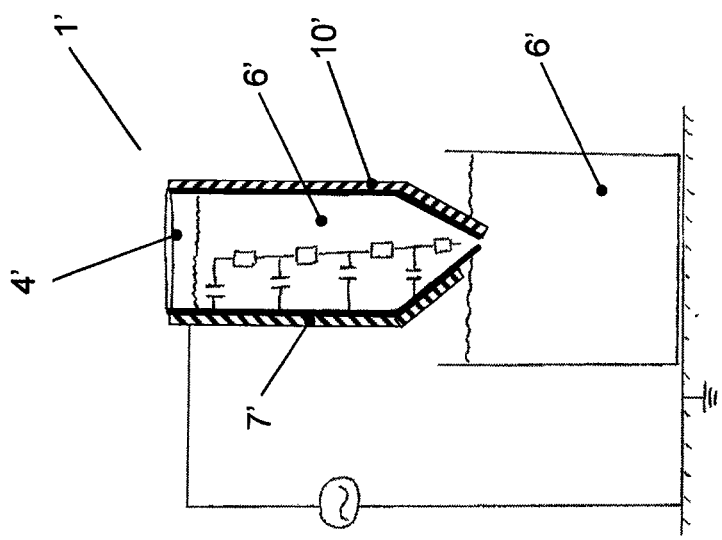
Fig. 6a) Prior art

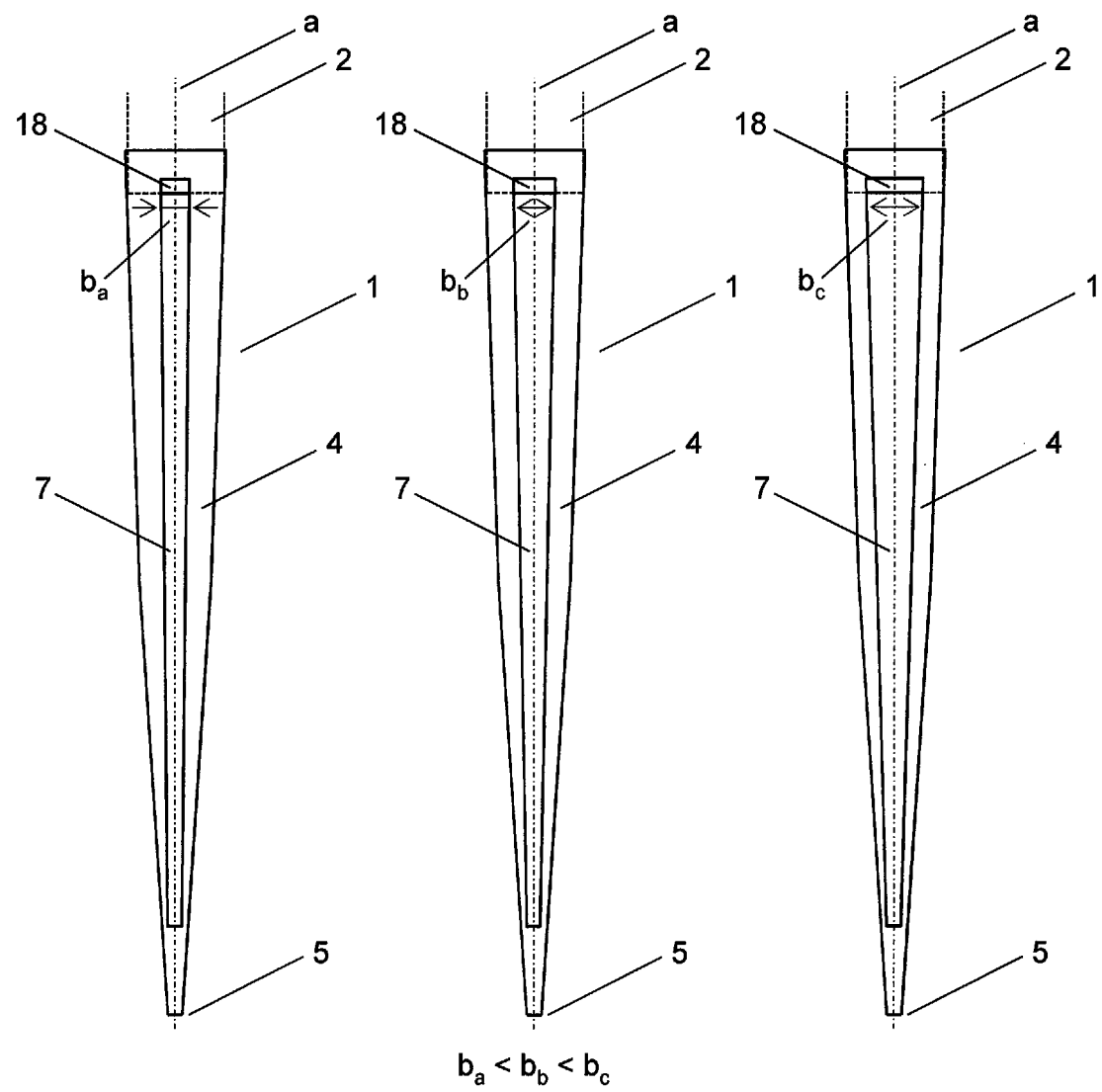

PIPETTE TIP FOR AN AUTOMATED PIPETTING DEVICE

RELATED APPLICATIONS

The present application claims the priority of the Swiss patent application CH 00950/16 with filing date 22 Jul. 2016, the contents of which are hereby incorporated into the present patent application, the priority of the Swiss patent application CH 00159/17 with filing date 10 Feb. 2017, the contents of which are hereby incorporated into the present patent application, and the priority of the Swiss patent application CH 00523/17 with filing date 19 Apr. 2017, the contents of which are hereby also incorporated into the present patent application.

TECHNICAL FIELD OF THE INVENTION

The present invention relates to the technical field of automated liquid processing systems and relates in particular to pipette tips, particularly disposable tips (so-called "DiTis"), which are used for pipetting liquids, i.e. for picking up or aspirating and/or delivering or dispensing liquids. Furthermore, the present invention relates to pipetting devices with such pipette tips, methods for determining the volume of a sample liquid in such pipette tips, methods for detecting such pipette tips on a pipetting device, methods for manufacturing such pipette tips, usages of such pipette tips and a set of such pipette tips.

BACKGROUND OF THE INVENTION

When large quantities of samples have to be examined in medical, chemical, analytical or pharmaceutical laboratories, automated laboratory systems or installations are usually used today to enable rapid and reliable processing of each individual sample.

Such laboratory systems are often designed as liquid processing systems for handling liquid volumes. Such liquid processing systems comprise in particular pipettors both for aspirating and dispensing liquids, or dispensers exclusively for dispensing liquids. Most laboratory applications require very precise pipetting operations to achieve satisfactory analytical accuracy. Consequently, a precise knowledge of the sample quantities or liquid volumes processed is of decisive importance.

In the Swiss patent application CH 00950/16 with filing date 22 Jul. 2016, a method is proposed which allows an exact determination of a processed (i.e. aspirated or dispensed) volume of liquid during pipetting, as well as a pipetting device which uses this method for a precise determination of the processed sample quantities or rather liquid volumes.

In many applications, a fresh pipette tip is used to handle each new sample. Such pipette tips are therefore designed for single use and are usually referred to as "disposable tips" (also known as "DiTis"). Depending on the application, different pipette tips are used for pipetting. It is therefore important that an automated pipetting device is capable of detecting whether a pipette tip is connected to the pipette tube and, in particular, whether the correct pipette tip is connected.

In the Swiss patent application CH 00159/17 with filing date 10 Feb. 2017, a method is proposed which allows the detection of a pipette tip on a pipetting device, as well as a pipetting device which can automatically detect different pipette tips by means of this method.

In the Swiss patent application CH 00523/17 with filing date 19 Apr. 2017, a method is provided which makes it possible to determine the volume of a sample liquid in a proposed pipette tip.

There is a problem in the prior art that the determination of a volume of a sample liquid with low electrical conductivity may be inaccurate.

Therefore, there is a need to provide suitable pipette tips which can be used to determine the volume of a sample liquid with low electrical conductivity in such a pipette tip, and to detect such pipette tips on a pipetting device.

SUMMARY OF THE INVENTION

It is therefore an object of the present invention to provide a pipette tip for connection to a pipette tube from a pipetting device, by means of which a precise determination of the volume of a sample liquid in the pipette tip is made possible even if the sample liquid has a low electrical conductivity. According to the invention, this object is achieved by the pipette tip according to claim 1.

It is another object of the present invention to provide a pipetting device with a pipette tube for the fluid-tight connection of a proposed pipette tip at its one end, wherein a connected pipette tip is precisely detected at the pipetting device. According to the invention, this object is achieved by the pipetting device according to claim 13.

It is another object of the present invention to provide a method which allows an exact determination of the volume of a sample liquid in a proposed pipette tip even if the sample liquid has a low electrical conductivity. This object is solved according to the invention by the determination method proposed in claim 19.

It is another object of the present invention to provide a method that allows the proposed pipette tip to be recognized on a pipetting device. This object is solved according to the invention by the recognition method proposed in claim 21.

It is a further object of the present invention to provide a method for manufacturing of a proposed pipette tip. This object is solved according to the invention by the manufacturing method proposed in claim 22.

It is a further object of the present invention to indicate a usage of a proposed pipette tip, which usage reliably determines the volume of a sample liquid in the pipette tip even if the sample liquid has a low electrical conductivity. Such usage according to the invention is indicated in claim 24.

Furthermore, it is an object of the present invention to provide a set of pipette tips suitable for usage with the proposed recognition method. Such a set of pipette tips according to the invention is indicated in claim 26.

Specific embodiment variants according to the invention are specified in the dependent claims.

A pipette tip according to the invention is provided for connection to a pipette tube of a pipetting device and formed as an elongated tube forming a pipette body having at one first end thereof an opening for aspirating and/or dispensing liquids and being formed at the other end thereof for (fluid-tight) connection to the pipette tube, wherein the pipette tip comprises a first electrode as volume measuring electrode of a measuring capacitor and a second electrode as immersion detection electrode, wherein the first electrode is provided on an outer surface of the pipette body or is embedded in the pipette body and the second electrode is provided at least partially on an inner surface of the pipette body. The wording "wherein the second electrode is provided at least partially on an inner surface of the pipette body" means that the second electrode is at least partially exposed to the inside of the pipette body. In this case, the second electrode can be embedded in sections in the material of the pipette body in such a way that it is still partially or sectionally exposed to the inside of the pipette body. It is irrelevant in this case whether the second electrode is embedded in the pipette body or even extends at least in sections along the outer surface of the pipette body, as long as one or more sections or rather contact points of the second electrode are still exposed to the inside of the pipette body and can therefore at least partially contact the liquid inside the pipette body.

In one embodiment variant of the pipette tip, the first electrode and second electrode are electrically conductive, and the second electrode at least partially contacts the liquid on the inner surface of the pipette body galvanically.

In another embodiment variant, the pipette body comprises an electrically non-conductive material, in particular a non-conductive plastic, such as non-conductive polypropylene, which acts at least as part of a dielectric of the measuring capacitor.

In another embodiment variant of the pipette tip, the second electrode is essentially provided outside the relevant measuring capacitor. Advantageously, the second electrode is provided outside the measuring capacitor. As a result, the parasitic capacitance arising from the second electrode may be negligible compared to the volume capacitance. In one example, the first electrode and the second electrode can be arranged essentially opposite to each other.

In a further embodiment variant of the pipette tip, the first electrode comprises at least two first partial electrodes, and the second electrode comprises at least two second partial electrodes, wherein the first partial electrodes are arranged opposite to each other and the second partial electrodes are arranged opposite to each other.

In a further embodiment variant of the pipette tip, the first electrode is formed elongated, in particular strip-shaped, extends axially along the pipette tip, and surrounds in an angular range between 20° and 270°, in particular, preferably in an angular range of 40°.

In a further embodiment variant of the pipette tip, the first electrode is formed elongated, in particular strip-shaped, extends axially along the pipette tip and is of different width in sections, wherein the first electrode has in particular a stepped width profile along the axial direction, and the width of the first electrode is smallest, for example at the first end, and the width increases stepwise in the axial direction.

In a further embodiment variant of the pipette tip, the first electrode does not extend to the opening at the first end and is particularly spaced from this opening in a range from 3 mm to 6 mm, preferably in a range from 4 mm to 6 mm, particularly preferred 5 mm.

In a further embodiment variant of the pipette tip, the second electrode is formed strip-shaped and extends axially along the tube, and wherein it surrounds in particular up to three quarters of the inner circumference of the pipette tip, and in particular half of the inner circumference of the pipette tip.

In a further embodiment variant of the pipette tip, the second electrode contacts the liquid in the pipette body at essentially predetermined contact points along the axial direction of the pipette body, wherein the contact points are arranged in an angular range between 90° and 270°, preferably 180°, to each other. In the case of the aforementioned pipette tip embodiment, in which the second electrode contacts the liquid inside the pipette body via contact points, these contact points can be arranged alternately from both sides, starting from the first electrode. In one embodiment variant, assumed the first electrode is at 0°, the contact points are particularly arranged at 90° and 270°.

In another embodiment variant of the pipette tip, the second electrode extends to the opening at the first end, or the opening at the first end is at least partially formed by the second electrode.

In another embodiment variant, the pipette tip is a disposable pipette tip, which is intended in particular for single use.

According to a further aspect of the present invention, a pipetting device comprises at least one pipette tube, a pressure-generating means and a (capacitance) measuring unit, wherein the pipette tube, at its one first end, is formed for the fluid-tight connection of a proposed pipette tip and is connected at its other end to the pressure-generating means. Next to the capacitance (imaginary part of the complex impedance), the resistive part (real part of the complex impedance) can also vary. Thus, the person skilled in the art understands that besides the capacitance also the resistive part is meant.

In an embodiment variant of the pipetting device, in a region for connecting the pipette tip, a first electrical contact is provided for establishing an electrical connection, in particular a galvanic connection, to a first electrode as volume measuring electrode, which is provided on an outer surface of the pipette body or is embedded in the pipette body. In one example, an additional or alternative second electrical contact may be provided for establishing an electrical connection to a second electrode as an immersion detection electrode which is at least partially provided on an inner surface of the pipette body.

In a further embodiment variant of the pipetting device, the liquid is contained in a sample container which is electrically conductively or capacitively coupled to a conductive worktable surface which is connected to ground.

In a further embodiment variant of the pipetting device, the first electrical contact is connected to the measuring unit via an electrical conductor, and the second electrical contact is connected to the measuring unit via the liquid and a capacitive coupling of the liquid via the worktable surface.

In a further embodiment variant of the pipetting device, the measuring unit is adapted to determine a volume of a sample liquid contained in the pipette tip, as a function of a measured capacitance of a measuring capacitor which is formed by the first electrode and at least a part of a sample liquid which can be loaded in the pipette tip as a counter electrode, and is further adapted to detect immersion of the pipette tip into the sample liquid by means of the second electrode.

In a further embodiment variant, the pipetting device further comprises a detection unit for recognizing whether the pipette tip is connected to the first end of the pipette tube, and/or for detecting a characteristic feature of the pipette tip based on a measurement of a further capacitance, wherein the further capacitance is dependent on one or more of the following characteristics:

- a material the pipette tip consists of;
- a geometry of the pipette tip, in particular a shape of the pipette tip, further in particular a diameter and/or a length of the pipette tip;
- a coating of the pipette tip, in particular a material of which the coating of the pipette tip consists, further in particular an expansion or thickness of the coating of the pipette tip;
- a material of which the first and/or second electrode is made;

a geometry (e.g. length, width, thickness or area) of the first and/or second electrode.

According to another aspect of the present invention, a method for determining a volume of a sample liquid in a proposed pipette tip comprises the following steps (=determination method):

measuring a capacitance of a measuring capacitor comprising a first electrode provided on an outer surface of the pipette body or embedded in the pipette body, and a counter electrode formed by at least a part of a sample liquid contained in the pipette tip;

determining the volume of the sample liquid in the pipette tip as a function of the measured capacitance.

In one embodiment variant, the determination method further includes the step of:

detecting immersion of the pipette tip into the sample liquid by means of a second electrode as immersion detection electrode (or immersion contact), wherein the second electrode is at least partially provided on an inner surface of the pipette body.

A further aspect of the present invention relates to a method of recognizing (=recognition method) a proposed pipette tip on a pipetting device having a pipette tube formed, at one first end thereof, for releasably receiving a pipette tip for aspirating or dispensing a liquid, and operatively connected, at the other end thereof, to a pressure-generating means, wherein the method comprises measuring a capacitance depending on at least one of the following characteristics:

a material the pipette tip is made of;
a geometry of the pipette tip, in particular a shape of the pipette tip, further in particular a diameter and/or a length of the pipette tip;
a coating of the pipette tip, in particular a material of which the coating of the pipette tip consists, further in particular an expansion or thickness of the coating of the pipette tip;
a material of which the first and/or second electrode is made;
a geometry (e.g. length, width, thickness or area) of the first and/or second electrode.

According to another aspect of the present invention, a method for manufacturing (=manufacturing method) a proposed pipette tip comprises forming the pipette tip as an elongated tube, forming a pipette body from a first material, forming a first electrode from a second material on the pipette tip on an outer surface of the pipette body or embedded in the pipette body, and forming a second electrode from a third material on the pipette tip at least partially on an inner surface of the pipette body. In one example, the second material and the third material can be the same.

In a further embodiment variant, the forming steps are carried out by means of a multi-component injection molding process, in particular the same multi-component injection molding process, sequentially or simultaneously with the forming of the pipette tip and the first and/or second electrode. In the case of manufacturing by sequential steps, in a first step, the non-conductive first material can be injected to form the pipette tip. After said material has solidified (e.g. approx. 6 seconds) the conductive second and third materials can be injected. Further manufacturing methods are of course possible.

Another aspect of the present invention relates to the usage of the proposed pipette tip in order to determine a volume of a sample liquid contained in the pipette tip, by means of the first electrode as a volume measuring electrode on the pipette tip, wherein the first electrode is provided on an outer surface of the pipette body or is embedded in the pipette body.

Another aspect of the present invention relates to the usage of the proposed pipette tip in order to detect immersion of the pipette tip in the sample liquid by means of the second electrode as an immersion detection electrode on the pipette tip, wherein the second electrode at least partially contacts the inner surface of the pipette body.

According to a further aspect of the present invention, a set of proposed pipette tips comprises at least two types of pipette tips, wherein the at least two types differ in that, when applying the proposed method for detecting a pipette tip, a capacitance of a first type of pipette tips lies in a first range and the capacitance of a second type of pipette tips lies in a second range, wherein said first and second ranges are not overlapping, and wherein said at least two types differ in particular by one of the following features:

volumetric capacity;
tip opening size/diameter for aspirating and dispensing a liquid;
with or without filter in order to prevent contamination of the pipette tube when aspirating a sample, and in particular a type of filter;
purity category;
intended use;
volume measurement function;
sealing capacity of a connection of the pipette tips to the pipette tube, and wherein in particular the external geometry of the at least two types may be identical.

It is expressly pointed out that the above embodiment variants can be combined as desired. Only those combinations of embodiment variants that would lead to contradictions due to the combination are excluded.

BRIEF DESCRIPTION OF THE DRAWINGS

Non-limiting embodiment examples of the present invention are explained in more detail below using figures, wherein:

FIG. 4a) shows a schematic diagram of a pipette tip immersion and emersion process for a container containing a sample liquid;

FIG. 4b) shows an exemplary temporal course of the capacitance of a measuring capacitor with signal jumps when the pipette tip is immersed in or withdrawn from the sample liquid;

FIG. 6a) shows a schematic representation of an aspiration process with a pipette tip filled with a sample liquid of e.g. low conductivity according to the prior art;

FIG. 6b) shows a schematic representation of an aspiration process with a pipette tip filled with a sample liquid of e.g. low conductivity in an embodiment of the invention;

FIGS. 8a),b),c) show schematic representations of three exemplary pipette tips according to the invention having electrodes of different widths, forming a set of three distinguishable types of pipette tips.

In the figures, same reference numerals represent same elements.

DETAILED DESCRIPTION OF THE INVENTION

Figure 1A:
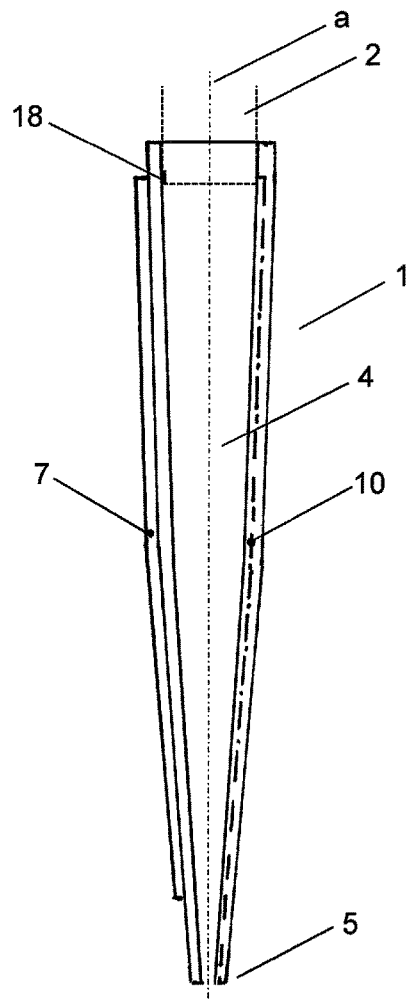
FIG. 1a) shows a schematic representation of a first embodiment example of a pipette tip according to the invention in a sectional view with a respective strip-shaped volume measuring electrode and immersion detection electrode in a view from the side.
Figure 1B:
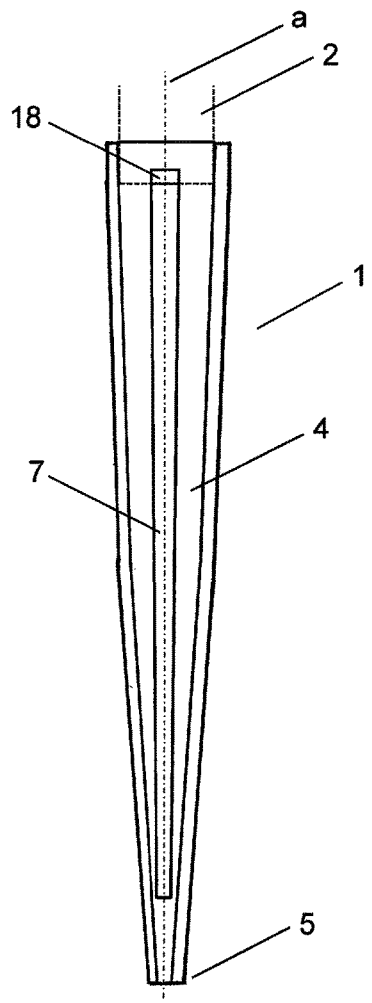
FIG. 1b) shows a schematic representation of the first embodiment example of a pipette tip according to the invention in a view from the front (onto the volume measuring electrode)

FIG. 1a), in a schematic representation, shows a first embodiment example of a pipette tip 1 with a strip-shaped volume measuring electrode 7 and a strip-shaped immersion detection electrode 10 in a sectional view from the side, while in FIG. 1b) the pipette tip 1 is shown in a view from the front (onto the volume measuring electrode).

The elongated tube, which forms a pipette body 4, has an essentially conical shape. The cross section of the tube can assume any shape, e.g. oval, rectangular, etc. The pipette body 4 could also be pyramid-shaped. According to the invention, the volume measuring electrode 7 is provided on an outer surface of the pipette body 4, and the immersion detection electrode 10 is provided on an inner surface of the pipette body 4. The immersion detection electrode 10 is shown dashed through the material of the pipette body 4. The immersion detection electrode 10 is provided inside the wall of the pipette body 4 and faces or rather is exposed to the inside of the pipette body 4. As a result, the sample liquid can contact the immersion detection electrode 10 along its entire length, as shown for example in FIG. 1a). The sample liquid can also contact the immersion detection electrode partially, e.g. at regular intervals (contact points) (not shown). The immersion detection electrode 10 extends up to the opening 5, such that it comes into contact with the sample liquid once immersed. In contrast, the volume measuring electrode 7 should not come into contact with the sample liquid, such that the volume measuring electrode 7, for example, does not extend to opening 5 and is spaced apart from it. The volume measuring electrode 7 and the immersion detection electrode 10 are electrically conductive and can essentially be arranged opposite to each other (more details will be given below). The immersion detection electrode 10, for example, can be made of the same material as the volume measuring electrode 7.

At its one first end, the pipette body 4 has an opening 5 for aspirating and/or dispensing liquids. The other end is designed for fluid-tight connection to a pipette tube 2, wherein the pipette tube 2, for example, has a cone as an adapter. The volume measuring electrode 7 acts as a first electrode of a measuring capacitor, which further comprises at least a part of a sample liquid, which can be loaded in the pipette tip 1 as a counter electrode. The pipette body 4 forms the dielectric of this measuring capacitor. The pipette body 4 may comprise an electrically non-conductive material which forms the dielectric, in particular a non-conductive plastic, such as e.g. a non-conductive polypropylene.

In the example shown, the volume measuring electrode 7 is arranged as a narrow strip onto the outer surface of the pipette body 4 and runs axially along the pipette tip 1 (with central axis a). The volume measuring electrode 7, for example, has a width in a range from 0.8 mm to 5 mm, preferably in the range from 0.8 mm to 2 mm, especially preferably 1 mm. At its upper end, the volume measuring electrode 7 has an electrical contact 18 by means of which the volume measuring electrode 7 can be galvanically connected to the pipette tube 2.

The immersion detection electrode 10 is also designed here as a narrow strip and runs axially along the pipette tip 1 (with central axis a). This immersion detection electrode 10 can be used to determine when the pipette tip 1 touches or rather penetrates the surface of the sample liquid and dips into it (→"capacitive liquid level detection", cLLD). According to the invention, the immersion detection electrode 10 is at least partially provided on the inner surface of the pipette body 4 or is at least partially exposed to the inside of the pipette body 4. In the example shown, the immersion detection electrode 10 is partially embedded in the wall of the pipette body 4. Thus, the immersion detection electrode 10 is at least partially in contact with the aspirated sample liquid, enabling a more accurate determination of the volume of the aspirated sample liquid, especially if the sample liquid has a low conductivity.

Details are explained in more detail below in connection with FIG. 6, among others.

Figure 1C:
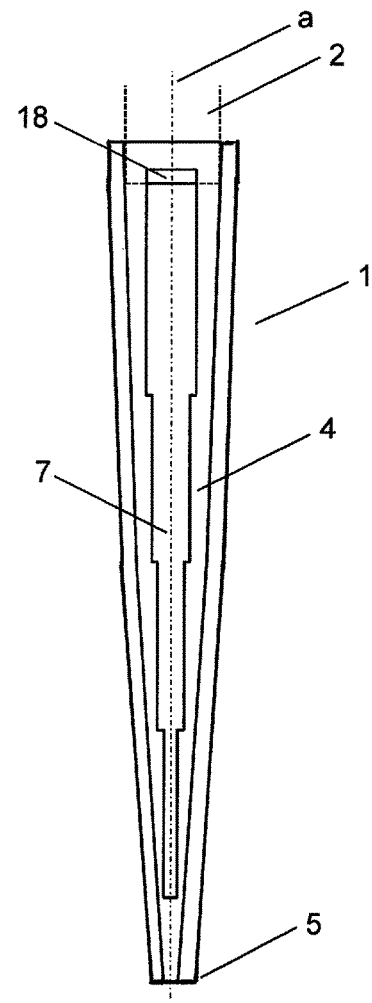
FIG. 1c) shows a schematic representation of a second embodiment example of a pipette tip according to the invention with a stepped volume measuring electrode in a view from the front.

In FIG. 1c) a schematic representation shows a second embodiment example of a pipette tip 1 with a stepped volume measuring electrode 7 in a front view. When such a volume measuring electrode 7 is used, capacitance jumps (in the volume characteristic, i.e. the volume of the sample liquid in the pipette tip 1 as a function of the measured capacitance) occur when the filling level of the pipette tip 1 exceeds one of the steps of the volume measuring electrode 7. For example, the filling level or rather volume of the sample liquid in the pipette tip 1 can be determined, at least roughly, largely independently of the conductivity of the sample liquid, e.g. in steps of ¼-, ½-, ¾-, 4/4-full (or finer as in tenths). Although not visible, in this embodiment example the immersion detection electrode is at least partially arranged on the inner surface of the pipette body 4.

Figure 2A:
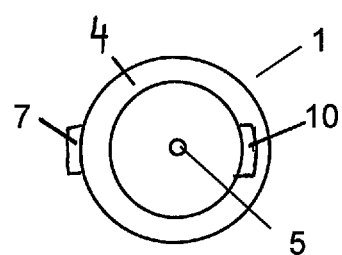
FIG. 2a) shows a schematic representation of the first embodiment example of a pipette tip according to the invention with a strip-shaped immersion detection electrode in a cross-sectional view from above.
Figure 2B:
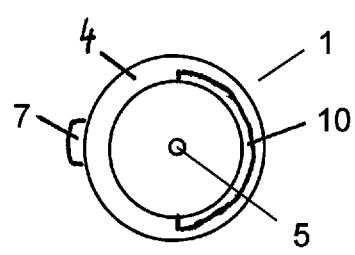
FIG. 2b) shows a schematic representation of the second embodiment example of a pipette tip according to the invention with an immersion detection electrode which is bent, as schematically illustrated in a cross-sectional view from above.

FIGS. 2*a*)-*c*) show the first and second embodiment examples as well as a third embodiment example of the pipette tip 1 in a cross-sectional view from above. The opening 5 is provided in the area of the central axis of the pipette tip 1. As can be seen in FIGS. 2*a*)-*c*), the volume measuring electrode 7 is arranged on the outer surface of the pipette body 4, while the immersion detection electrode 10 at least partially forms or contacts the inner surface of the pipette body 4. The immersion detection electrode 10 can run axially along the pipette body 4 and be formed strip-shaped as shown in FIG. 2*a*). Alternatively, the immersion detection electrode 10 can also be arc-shaped and surround the pipette body 4 arc-like up to a certain inner circumference, as shown in FIG. 2*b*). In an example, as shown in FIG. 2*b*), the arc-shaped immersion detection electrode 10 can surround the pipette body 4 by half its inner circumference (180°). In another example, the arc-shaped immersion detection electrode can surround the pipette body 4 inside by three quarters of its inner circumference)(270°) (not shown). Another advantageous surround angle is 220°. If technically reasonable, further surround angle ranges are possible with which the arc-shaped immersion detection electrode 10 can surround the pipette body 4 inside or rather face the inside of the pipette body 4.

Figure 2C:
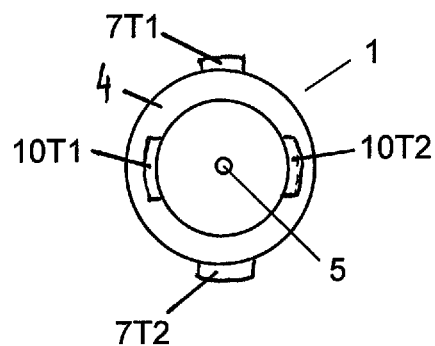
FIG. 2c) shows a schematic representation of a third embodiment example of a pipette tip according to the invention with two first partial electrodes and two second partial electrodes in a cross-sectional view from above.

In another example, the first electrode may contain at least two first partial electrodes 7T1, 7T2 and the second electrode may contain at least two second partial electrodes 10T1, 10T2, wherein the first partial electrodes 7T1, 7T2 are arranged opposite to each other and the second partial electrodes 10T1, 10T2 are arranged opposite to each other as shown in FIG. 2*c*).

Figure 2D:
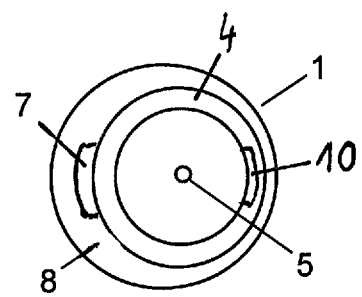
FIG. 2d) shows a schematic representation of a fourth embodiment example of a pipette tip according to the invention with a coating over the volume measuring electrode in a cross-sectional view from above.

FIG. 2*d*) shows a fourth embodiment example of the pipette tip 1 in a cross-sectional view from above with a coating 8 over the volume measuring electrode 7 and over the rest of the pipette body 4 (i.e. over the outer surface of the pipette tip 1). For example, this coating 8 can only be present in an area of the volume measuring electrode 7, e.g. in order to prevent the volume measuring electrode 7 from coming into contact with the sample liquid, once the pipette tip 1 is lowered too far into the sample liquid. On the other hand, the entire pipette tip 1 may be coated with a coating 8, such as hydrophobic, oleophobic or antibacterial coating 8.

Figures 3A, 3B:
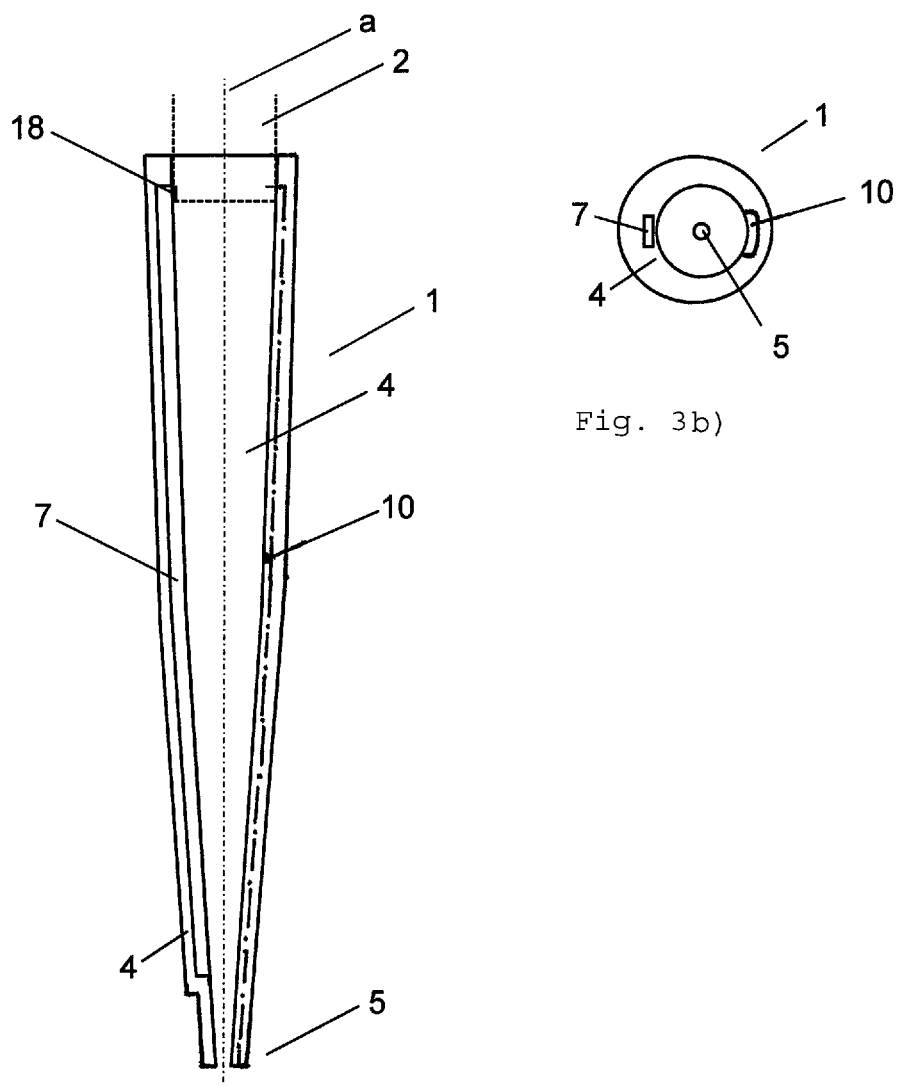
FIG. 3a) shows a schematic representation of a fifth embodiment example of a pipette tip according to the invention with a volume measuring electrode embedded in the pipette body and an immersion detection electrode on the inner surface of the pipette body in a view from the side.
FIG. 3b) shows a schematic representation of the fifth embodiment example of a pipette tip according to the invention in a cross-sectional view from above.

In FIG. 3*a*), a schematic representation shows a fourth embodiment example of a pipette tip 1 with a volume measuring electrode 7 embedded in the pipette body 4 and an immersion detection electrode 10 arranged at least partially on the inner surface of the pipette body 4, in a sectional side view. The volume measuring electrode 7 is separated from the inside of the pipette body 4 by the material of the pipette body 4, which material serves as dielectric. The volume measurement electrode 7 and immersion detection electrode 10 are formed strip-shaped and run axially along the pipette body 4. The immersion detection electrode 10 extends to the opening 5, while the volume measurement electrode 7 can extend nearly to the opening 5. The same pipette tip 1 is shown in FIG. 3*b*) in a schematic view from above. In this case, the volume measuring electrode 7 is surrounded on all sides by the material of the pipette body 4 and enclosed in it. Here, too, the immersion detection electrode 10 faces or rather is exposed to the inside of the pipette body 4, sectionwise, and can contact the sample liquid contained therein.

FIG. 4*a*) illustrates in a schematic representation a usage of the proposed pipette tip 1 for immersion detection (→cLLD), i.e. for determining the point in time from which the pipette tip 1 is immersed into (and emerges from) a sample liquid 6 which is loaded in a container 19, such as a tub, a sample tube or a "well" in a microplate. According to the invention, the immersion detection electrode 10 is at least partially arranged on the inner surface of the pipette body 4, as indicated schematically. As can be seen from the temporal course of the measured capacitance in FIG. 4*b*), the capacitance increases abruptly as soon as the immersion detection electrode 10 touches the sample liquid 6 and dips into it, and then again drops abruptly as soon as the immersion detection electrode 10 is pulled out of the sample liquid 6.

Figure 5B:
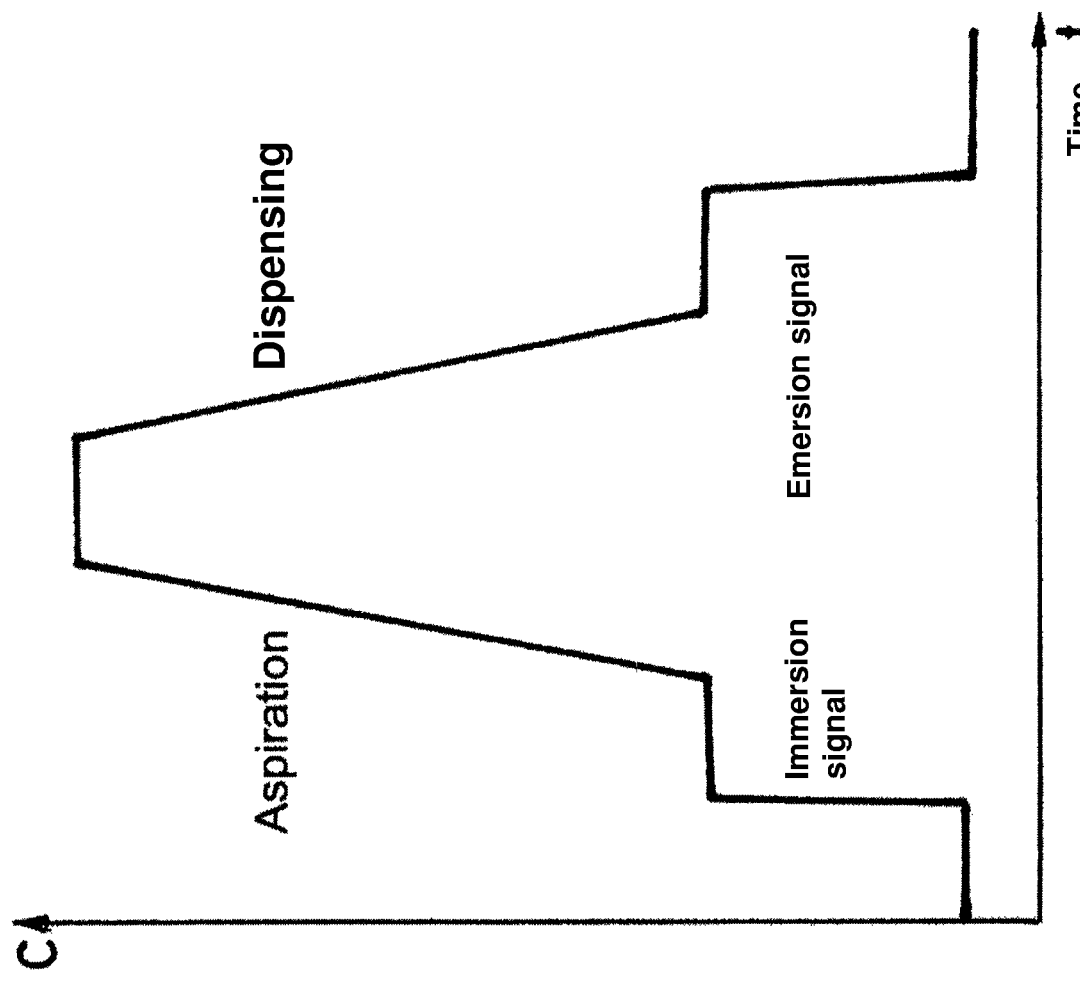
FIG. 5b) shows an exemplary time course of the capacitance of a measuring capacitor with a linear signal increase and decrease during aspiration and dispensing of the sample liquid by means of the pipette tip.
Figure 5A:
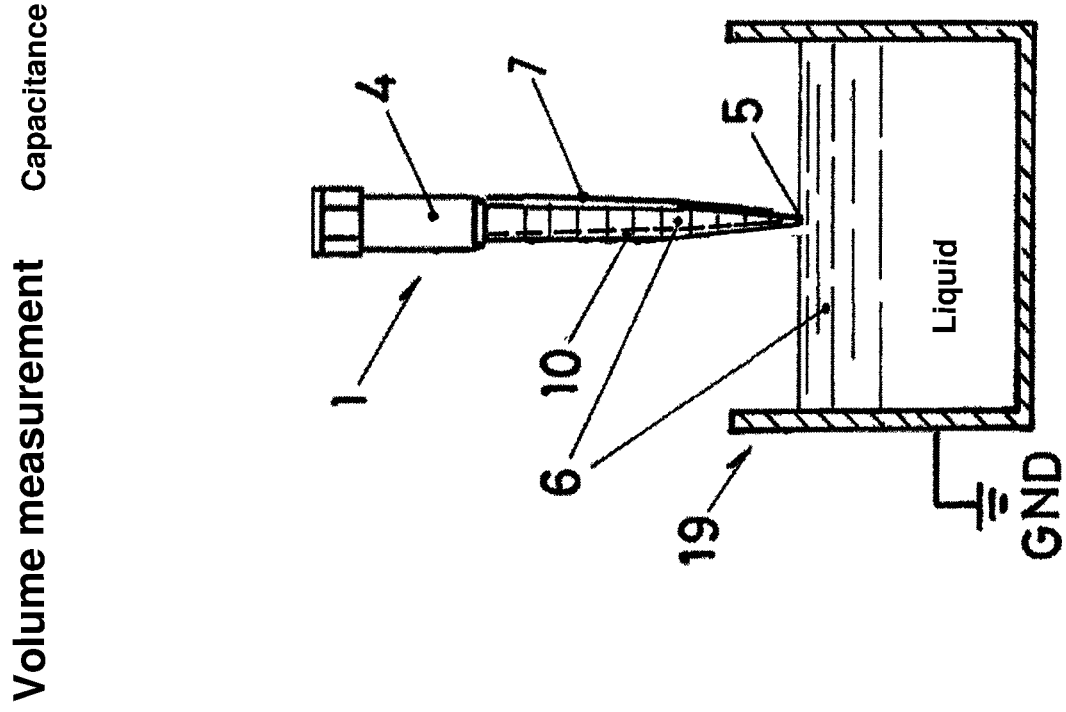
FIG. 5a) shows a schematic representation of an aspiration and dispensing process of a pipette tip according to the invention at the container containing the sample liquid.

FIG. 5*a*) illustrates the usage of the suggested pipette tip 1 in order to measure the volume of the sample liquid 6 contained in the pipette tip 1 during aspiration and dispensing. As can be seen from the temporal course of the measured capacitance in FIG. 5*b*), the capacitance rises abruptly as soon as the immersion detection electrode 10 contacts the sample liquid 6 and dips into it, then rises linearly (depending on the shape of the pipette tip 1 and the geometry of the volume measurement electrode 7) due to the raising sample liquid column in the pipette tip 1, which forms an increasing counter electrode vis-à-vis the volume measurement electrode 7, then drops linearly during dispensing, and finally jumps down again as soon as the immersion detection electrode 10 is pulled out of the sample liquid 6.

FIG. 6*a*) schematically depicts a pipette tip 1' according to the prior art which is filled with sample liquid 6', while FIG. 6*b*) schematically depicts a pipette tip 1 filled with sample liquid 6 according to an embodiment variant of the invention.

In both representations it is assumed that the pipette tips 1, 1' have loaded a large volume of the sample liquid 6, 6', wherein the sample liquid 6, 6' is assumed to be a liquid with a low conductivity. It is also assumed in both cases that the volume measuring electrode 7, 7' is provided outside the sample liquid 6, 6' in the sample container or rather is not in contact with it.

It is known in the prior art that an immersion detection electrode 10' is attached to the outer surface of a pipette body 4' of the pipette tip 1', as shown in FIG. 6*a*).

According to the invention, the immersion detection electrode 10 is at least partially attached to the inner surface of the pipette body 4, as shown in FIG. 6*b*). Alternatively, the immersion detection electrode 10 can contact the liquid column in the pipette tip 1 at regular intervals (not shown), as explained in more detail below.

Referring again to the prior art example as shown in FIG. 6*a*), assuming a sample liquid 6' has a low conductivity, the resistance within the sample liquid 6' increases with increasing sample liquid 6' column in the pipette tip 1', as schematically indicated by a capacitively coupled resistance series circuit (RC circuit). With increasing volume of the sample liquid 6' in the pipette tip 1', the capacitance increases and the resistive part of the impedance increases. However, the capacitance and the resistive part of the impedance increase to an unequal extent, whereby the phase angle of the complex impedance varies. This makes the volume measurements inaccurate.

If, however, the immersion detection electrode 10 is at least partially attached to the inner surface of the pipette body 4, as proposed by the invention and schematically shown in FIG. 6*b*), the resistive part increases to the same extent as the capacitance. Therefore, the phase angle of the complex impedance remains unchanged and the imaginary capacitive part remains dominant. This results advantageously in very precise volume measurements. In other words, due to the advantageous arrangement of the immersion detection electrode 10 directly on the inner surface of the pipette body 4, the immersion detection electrode 10 is always at the same potential as the sample liquid 6, which advantageously eliminates a dependence of the conductivity of the sample liquid on the volume of the sample liquid 6 in the pipette body 4.

Figure 7:
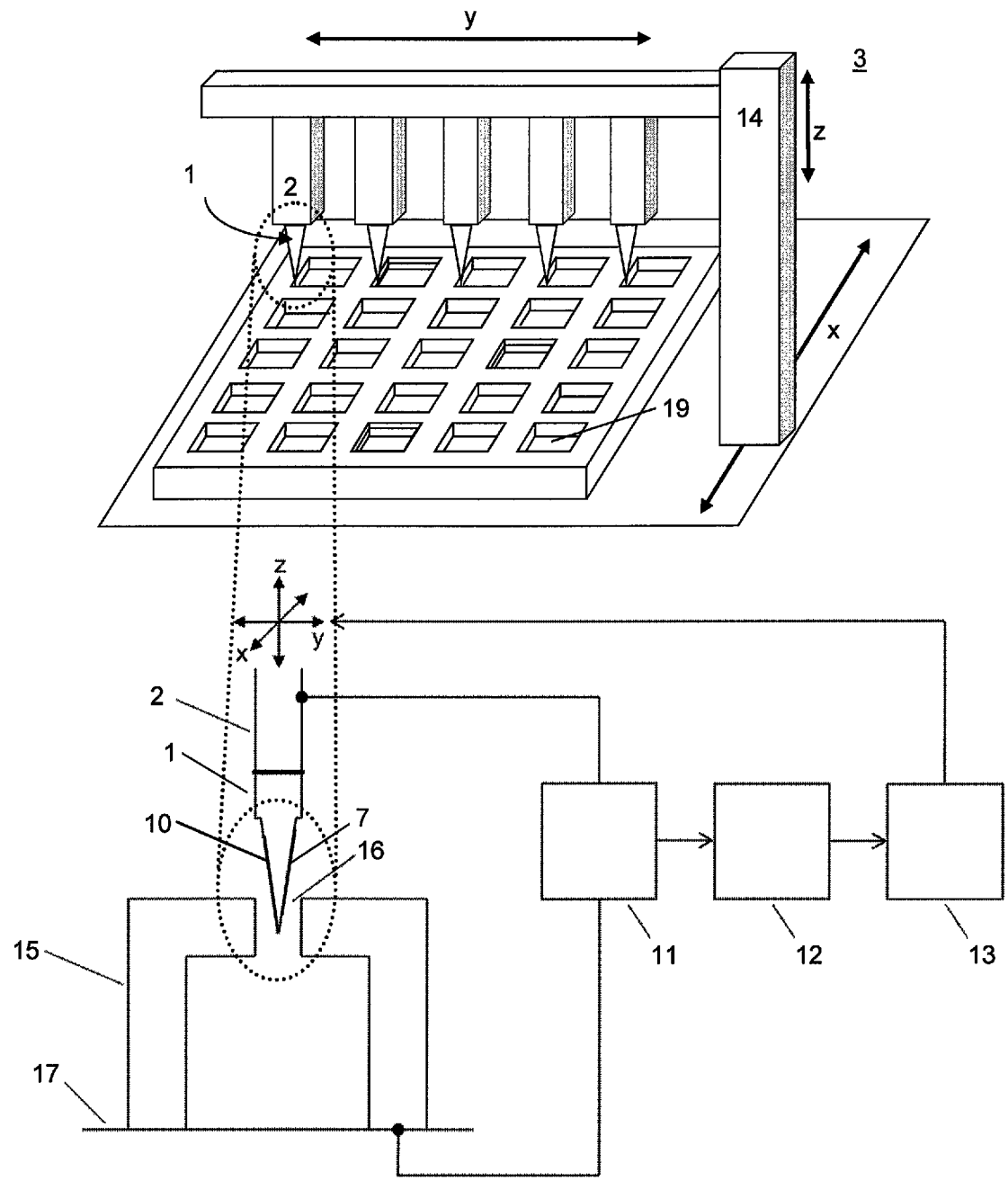
FIG. 7 shows a schematic illustration of an embodiment example of a pipetting device according to the invention or rather a liquid processing system according to the invention.

FIG. 7 illustrates in a simplified schematic representation an embodiment example of a pipetting device according to the invention. This illustration shows the pipette tube 2 with an attached pipette tip 1, which was previously removed from a receptacle 16 of a pipette tip holder 15 and is now moved vertically upwards by a robotic arm 14 on a liquid processing system 3 and thus removed from the pipette tip holder 15. A capacitance measuring unit 11, which is connected to the pipette tube 2 and thus also to the pipette tip 1 as the first electrode, as well as to the worktable or work surface 17 and thus also to the pipette tip holder 15 (or a component thereof) as the second (counter) electrode, can determine the (absolute) capacitance of the measuring capacitor comprising these two electrodes. Depending on the type or rather category (e.g. size/volume) of the pipette tip 1, the measured value of the capacitance will be different. For this purpose, the measured value of the capacitance in a detection unit 12 is compared with different reference values, wherein each reference value is characteristic for a certain type or certain category of pipette tip 1. The detection unit 12 then passes information on whether a pipette tip 1 is connected to the pipette tube 2 and, if so, which type or category of pipette tip 1 is involved, to a control unit 13 of a drive for the robotic arm 14. The robotic arm 14 has a first horizontal movement axis (x-direction, e.g. forward and backward), a second horizontal movement axis (y-direction, e.g. left and right) and a vertical movement axis (z-direction, e.g. downwards and upwards).

For example, the pipette tip holder 15 can also be part of the liquid processing system 3, wherein the robotic arm 14 moves the pipette tube 2 with connected pipette tip 1 towards the pipette tip holder 15, in order to determine the capacitance and thus the pipette tip type or size and lowers it into the receptacle 16 for capacitance measurement. Thus, the pipette tip holder 15 is a separate/dedicated "measuring station" for pipette tip detection within the liquid processing system 3.

Finally, FIGS. 8a)-c) show a schematic representation of three pipette tips 1, each with a volume measuring electrode 7 of different widths, as an example. The three pipette tips 1 can form a set of three distinguishable types of pipette tips 1, which can be distinguished from each other and recognized by means of the proposed recognition method based on the different capacitances resulting from the different widths $b_a < b_b < b_c$ of the volume measuring electrodes 7. In addition or alternatively, although not shown in the figures, the respective immersion detection electrodes of the three pipette tips 1 can each have a different width, whereby the three pipette tips 1 can be distinguished from each other and recognized by means of the proposed recognition method based on the different capacitances resulting from the different widths of the immersion detection electrodes.

Figure 9A:
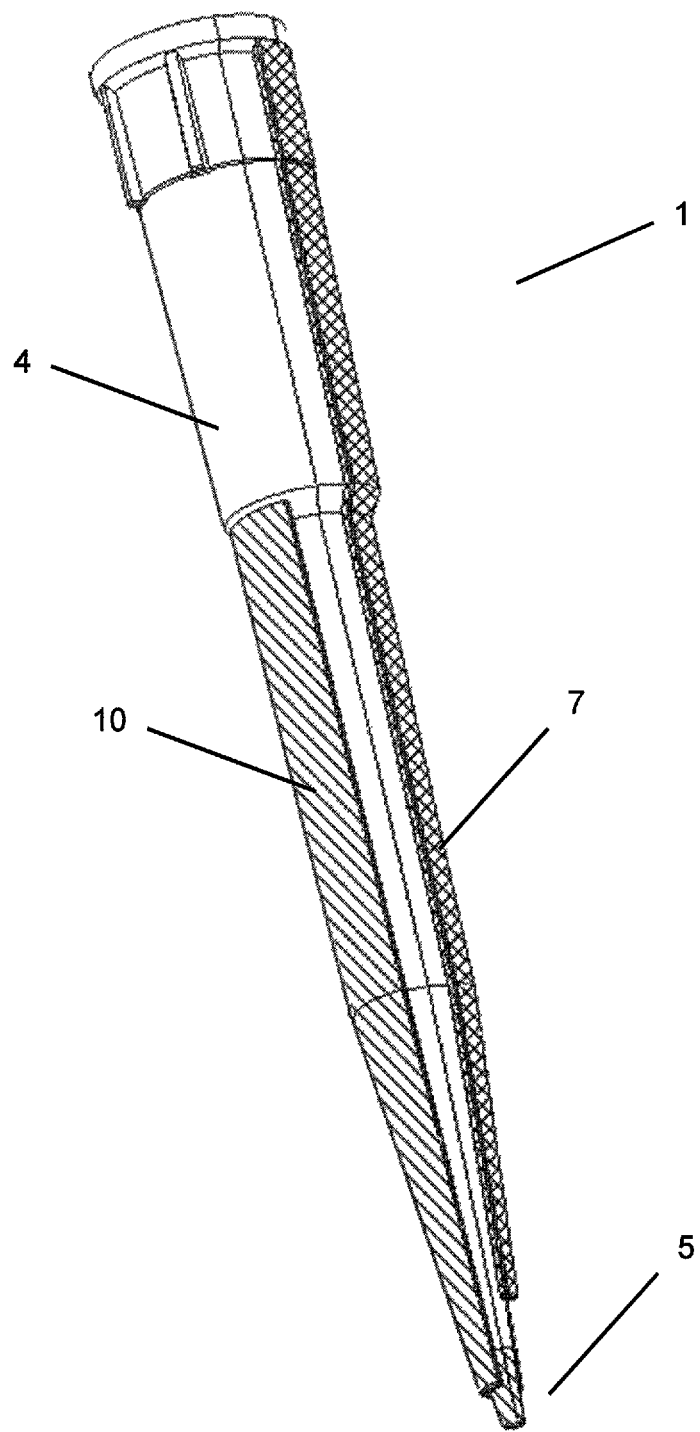
FIGS. 9a),b),c) show representations of a pipette tip according to another embodiment of the invention in three different views.
Figure 9B:
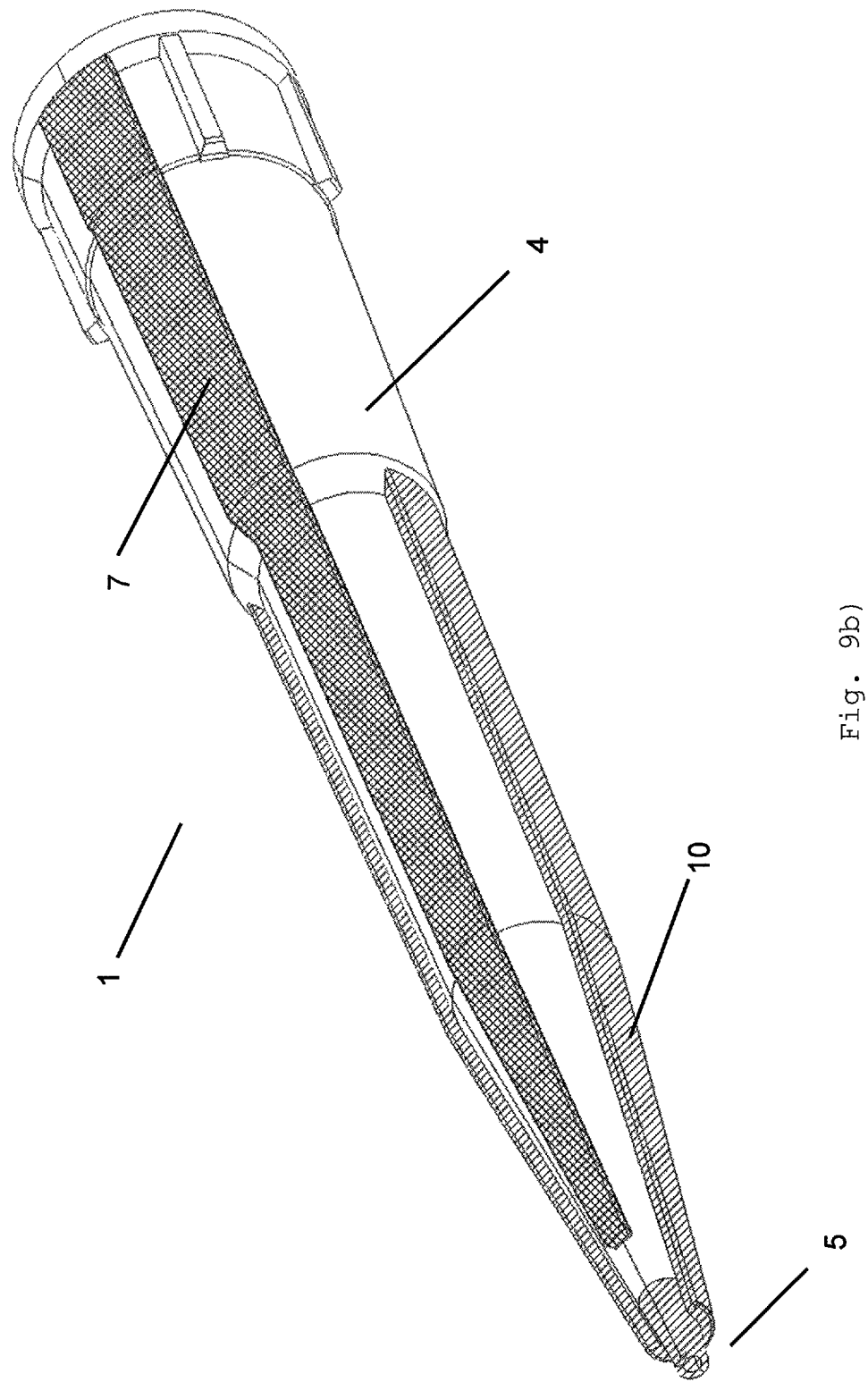
Figure 9C:
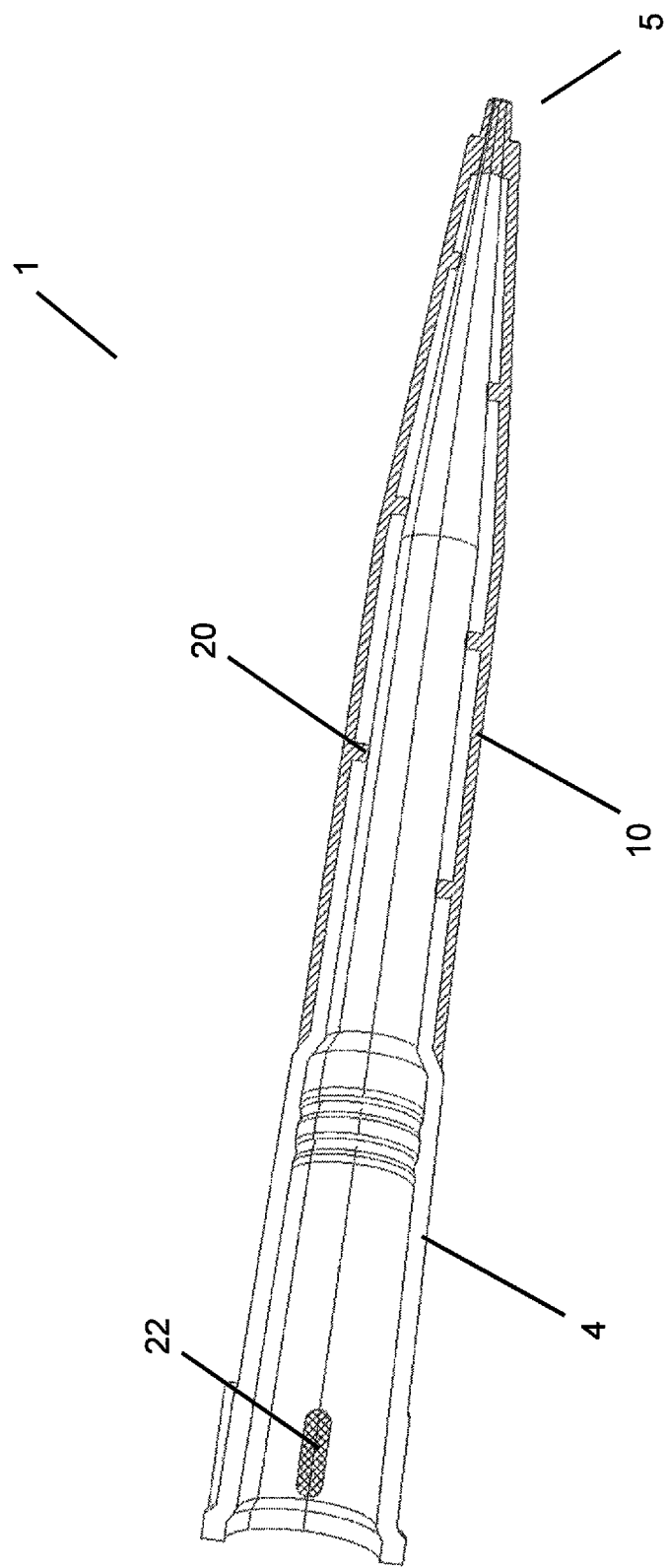

FIGS. 9a)-c) illustrate the pipette tip 1 according to the invention in another embodiment. In this embodiment, the first electrode 7 is arranged as a volume measuring electrode on the outer surface of the pipette body 4. The first electrode 7 does not extend to the opening 5 at the front tip of the pipette body 4 (first end) and is spaced from this opening 5. The second electrode 10 as the immersion detection electrode is arranged in such a way that it is partially provided on the inner surface of the pipette body 4. For this purpose, contact points 20 of the second electrode 10 project into the interior of the pipette body 4 in such a way that the surfaces at the respective distal end are flush, for example, with the inner surface of the pipette body 4, as shown, for example, in FIG. 9c). Although not shown, the surfaces at the distal end can also not be flush with the inner surface of the pipette body 4. Further sections of the second electrode 10 extend along the outer surface of the pipette body 4 and can be electrically connected from there. The immersion detection electrode 10 surrounds the pipette body 4 with a surround angle of e.g. >180°, e.g. 220°. Thus, advantageously, it is possible that contact points 20 can be arranged opposite each other, as shown in FIG. 9c). In addition, contact points 20 arranged opposite each other can be offset from each other. The contact points 20 opposite each other can be spaced apart at a fixed offset.

In the example shown, the front tip of the pipette body 4 in the area of the opening 5 thereof is completely surrounded by the material of the second electrode 10. In an example, the opening in the interior can also be surrounded, sectionwise, by the material of the second electrode 10. Therefore, improved immersion detection can be achieved. The first electrode 7 is arranged in the opening part (sector) of the partially surrounding second electrode 10. Advantageously, the second electrode 10 is arranged in the middle therein. As shown in FIG. 9c), the non-conductive material of the pipette body 4 is provided in the upper portion thereof with a passage opening 22 through which electrical contact with the (outer) first electrode 7 is achieved from inside the pipette body 4. This allows the first electrode 7 to be electrically connected to the pipette tube (see FIG. 7).

LIST OF REFERENCE NUMERALS

1 Pipette tip
2 Pipette tube
3 Pipetting device
4 Pipette body
5 Opening at a first end of the pipette body
6 (Sample) liquid
7 First electrode, volume measuring electrode
7T1, 7T2 First partial electrodes
8 Electrically insulating layer/coating (over the first electrode and pipette body)
10 Second electrode, immersion detection electrode
10T1, 10T2 Second partial electrodes
11 (Capacitance) measuring unit
12 Detection unit
13 Control unit for controlling the movement of the drive of the pipetting robot
14 Pipetting robot incl. drive
15 Pipette tip holder/support
16 Receptacle for a pipette tip
17 Worktable/work surface
18 Electrical contact
19 (Sample) container, e.g. a microplate with wells
20 Contact point
22 Passage opening
a Pipette tip axis
$b_a$ Electrode width a
$b_b$ Electrode width b
$b_c$ Electrode width c First horizontal movement axis of the pipetting robot (e.g. forwards and backwards)
y Second horizontal movement axis of the pipetting robot (e.g. to the left and right)
z Vertical movement axis of the pipetting robot (downwards and upwards)

The invention claimed is:

1. Pipette tip (1) for connection to a pipette tube (2) of a pipetting device (3), comprising:
an elongated tube forming a pipette body (4) having at one first end thereof an opening (5) for aspirating and/or dispensing liquids and being adapted at the other end thereof for connection to the pipette tube (2),
wherein the pipette tip (1) comprises a first electrode (7) as volume measuring electrode of a measuring capacitor, and a second electrode (10) as immersion detection electrode, wherein the first electrode (7) is disposed on an outer surface of the pipette body (4) or is embedded in the pipette body (4), and wherein the first electrode (7) does not extend to the opening (5) at the first end and in particular is spaced from this opening (5), and the second electrode (10) is disposed on an inner surface of the pipette body (4), wherein the first electrode (7) and second electrode (10) are electrically conductive, and the second electrode galvanically contacts the liquid at the inner surface of the pipette body, and
wherein the first electrode (7) and second electrode (10) are adapted to be connected to a measuring unit (11) for determining a volume of a sample liquid (6) contained in the pipette tip (1), as a function of a measured capacitance of a measuring capacitor which is formed by the first electrode (7) and at least a part of a sample liquid (6) contained in the pipette tip (1) as a counter electrode, and for detecting immersion of the pipette tip (1) into the sample liquid (6) by means of the second electrode (10).

2. Pipette tip (1) according to claim 1, wherein the pipette body (4) comprises an electrically non-conductive material, in particular a non-conductive plastic, such as for example non-conductive polypropylene, which acts in particular at least as a part of a dielectric of the measuring capacitor.

3. Pipette tip (1) according to claim 1, wherein the second electrode (10) is arranged outside the relevant measuring capacitor.

4. Pipette tip (1) according to claim 1, wherein the first electrode comprises at least two first partial electrodes (7T1, 7T2) and the second electrode comprises at least two second partial electrodes (10T1, 10T2), wherein the first partial electrodes (7T1, 7T2) are arranged opposite to each other and the second partial electrodes (10T1, 10T2) are arranged opposite to each other.

5. Pipette tip (1) according to claim 1, wherein the first electrode (7) is formed elongated, in particular strip-shaped, and extends axially along the pipette tip (1), and surrounds in particular in an angular range between 20° and 270°, preferably in an angular range of 40°.

6. Pipette tip (1) according to claim 1, wherein the first electrode (7) is formed elongated, in particular strip-shaped, extends axially along the pipette tip (7) and is of different width in sections, wherein the first electrode (7) in particular has a stepped width profile in the axial direction, and the width of the first electrode (7) is smallest at the first end, for example, and the width increases stepwise in the axial direction.

7. Pipette tip (1) according to claim 1, wherein the first electrode (7) is spaced from the opening (5) in a range from 3 mm to 6 mm, preferably in a range from 4 mm to 6 mm, particularly preferably 5 mm.

8. Pipette tip (1) according to claim 1, wherein the second electrode (10) is formed strip-shaped and extends axially along the tube, and in particular surrounds up to three quarters of the inner circumference of the pipette tip (1), further in particular surrounds half the inner circumference of the pipette tip (1).

9. Pipette tip (1) according to claim 1, wherein the second electrode (10) contacts the liquid in the pipette body (4) at predetermined contact points (20) along the axial direction of the pipette body (4), wherein the contact points (20) are arranged with respect to one another in an angular range between 90° and 270°, preferably 180°.

10. Pipette tip (1) according to claim 1, wherein the second electrode (10) extends to the opening (5) at the first end.

11. Pipette tip (1) according to claim 1, wherein the pipette tip (1) is a disposable pipette tip which is intended in particular for single use.

* * * * *